United States Patent [19]
Feichtiger et al.

[11] Patent Number: 4,830,054
[45] Date of Patent: May 16, 1989

[54] COMPONENT ASSEMBLY OF SEVERAL DIRECTIONAL CONTROL VALVES ADAPTED TO BE SHIFTED ELECTROMAGNETICALLY INDEPENDENTLY OF ONE ANOTHER

[75] Inventors: Dieter Feichtiger, Aidlingen; Klaus Neuffer, Boeblingen; Wolfgang Biber, Eutingen; Elmar Freitag, Weil der Stadt, all of Fed. Rep. of Germany; Jean P. Corbier, Beausoleil; Christian Dragoni, Contes, both of France

[73] Assignees: Daimler-Benz Aktiengesellschaft, Stuttgart, Fed. Rep. of Germany; Eaton S.A.M., Monaco

[21] Appl. No.: 199,421

[22] Filed: May 27, 1988

[30] Foreign Application Priority Data

May 29, 1987 [DE] Fed. Rep. of Germany ....... 3718070

[51] Int. Cl.[4] .............................................. F16K 11/00
[52] U.S. Cl. .................................... 137/884; 137/269; 137/560; 137/881; 251/129.21
[58] Field of Search ........... 137/269, 270, 560, 561 R, 137/881, 883, 884; 251/129.21

[56] References Cited

U.S. PATENT DOCUMENTS 2,614,584 10/1952 Goepfrich ...................... 251/129.21
4,399,836 8/1983 de Verterre et al. ........... 137/884 X
4,507,707 3/1985 Willis ............................. 137/884 X
4,529,166 7/1985 Klausen et al. ............ 251/129.21 X

FOREIGN PATENT DOCUMENTS 3100519 8/1982 Fed. Rep. of Germany ...... 137/884
3634349 5/1987 Fed. Rep. of Germany .

*Primary Examiner*—A. Michael Chambers
*Assistant Examiner*—John C. Fox
*Attorney, Agent, or Firm*—Barnes & Thornburg

[57] ABSTRACT

A component group of electromagnetically shiftable directional control valves which can be installed in a simple manner includes 2/2- and 3/2-directional control valves preassembled on an electrical printed circuit board and secured in common with the printed circuit board by plugging-in the directional control valves into plug-in receptacles of a base element and by fastening a cover at the base element in the housing formed by the base element and the cover; a pneumatic main channel extends between the base element and the cover which is in fluidic communication with several directional control valves and which is tightly closed off by fastening the cover at the base element.

19 Claims, 3 Drawing Sheets

COMPONENT ASSEMBLY OF SEVERAL DIRECTIONAL CONTROL VALVES ADAPTED TO BE SHIFTED ELECTROMAGNETICALLY INDEPENDENTLY OF ONE ANOTHER

BACKGROUND AND SUMMARY OF THE INVENTION

The present invention relates to a directional control valve component assembly of several directional control valves adapted to be electromagnetically shifted independently of one another, which are plugged-in or inserted into plug-in receptacles or sockets of a common base element and which separate from one another or connect with one another fluidic feed and load connection paths provided in the base element and terminating in the plug-in receptacles, whereby the plug-in receptacles are fluidically sealed off by the directional control valves when the latter are inserted or plugged-in into the plug-in receptacles, and whereby the feed and load connection paths exit on a surface of the base element.

A component assembly of the aforementioned type is disclosed in the prior patent application P No. 36 34 349.8-14 (DE-PS No. 36 34 349).

In this prior art patent, the individual directional control valves are clamped-in between a base element and a cover plate. An electric printed circuit board, connected with the solenoid windings of the directional control valves for the current distribution, is arranged outside of the clamped-in area of the directional control valves and can be connected only after the completed installation of the mechanical parts of the component group.

Air-conditioning systems are used in motor vehicles whose various fan flaps, in part, must be displaced only into an open and into a closed end position, but in part must also be adjusted steplessly over a certain pivot or slide range. If vacuum-actuated single-acting adjusting motors are now provided for the adjustment of the fan flaps, then the same must be acted upon with vacuum from a vacuum installation, for example, by way of solenoid directional control valves, respectively, must be vented again. A large number of magnetically actuated directional control valves is required for such a motor vehicle-air-conditioning installation which, however, must be installed for the most part under very constricted space conditions.

It is desirable to be able to accommodate all magnetic directional control valves near one another and protected against mechanical damage.

A directional control valve component assembly far-reachingly satisfying such requirements is already known (DE-OS No. 32 18 006). In this prior art the directional control valves are individually plugged-in at a common base element with simultaneous fluidic and electrical contact-making, however, without any further protection against mechanical damages and loosening. Furthermore, each individual directional control valve includes a load connection piece, with which a vacuum line is connected. With a careless attachment of the vacuum line, for example, after a valve exchange, a damaging of the fluidic or especially of the electric plug-in connection cannot be precluded.

It is the object of the present invention to so construct a directional control valve component assembly of the aforementioned type that—with the use of air as working medium—it can be installed in a simple but operationally reliable manner.

The underlying problems are solved according to the present invention in that the electric printed circuit board (PC board) is additionally constructed as carrier of the directional control valves electricaly and mechanically securely connected therewith and is fixed by the plugging-in thereof into the plug-in receptacles of the base element, in that contours corresponding with one another are provided at the cover and at the base element for the formation and sealing of a pneumatic main channel extending through the housing during the fastening of the cover at the base element, whereby a feed connection piece arranged outside at the housing and the feed connection paths of a group of first directional control valves terminating in a surface of the base element delimiting the main channel are connected by the main channel, in that additionally support elements for fixing the position of the directional control valves and/or the electrical PC board are provided at the cover, and in that feed connection paths of a group of second directional control valves not connected with the main channel terminate open toward the atmospheric pressure at another surface of the base element.

The electrical connections of the directional control valves are initially peened or bent over with the corresponding contacts on the electrical PC board, which is mechanically rigidly constructed, and additionally are soldered together. A stable arrangement results therefrom which can be plugged together as a whole with the base element while establishing the fluidic contact between the directional control valves and their connecting paths. A groove-like channel is provided in the base element which is closed off by a cover covering off the directional control valves and the PC board. An elastic seal for the channel is integrated into the cover.

Additional assembly and manufacturing operations (for example, drilling or shaping operations) are avoided with this arrangement of the pneumatic main channel. Thus, the open groove can be provided considerably more simply in a plastic injection-molded part than a long tunnel bore which requires the forming-out of a corresponding core. Furthermore, also branch bores or channels can be provided in a more simple and precise manner. Additionally, the directional control valves and the PC board can be secured in position against loosening out of the plug-in receptacles by further support elements integrated into the cover.

It is necessary for the stepless adjustment of a singly operating vacuum-adjusting motor to alternately vent or evacuate the pressure chamber thereof.

In an advantageous construction of the directional control valve component assembly in accordance with the present invention, the connection of such a vacuum-adjusting motor is made possible by way of only a single pressure line which is connected to a common load connection path of two 2/2 directional control valves.

In that connection, it is known (DE-OS No. 30 47 209) to provide two 2/2-directional control valves of similar construction in the housing of a steplessly adjustable vacuum-adjusting motor whose two load connection paths terminate separately from one another directly in the pressure chamber of the vacuum-adjusting motor. However, this prior art provides no indication for the construction of a directional control valve component assembly in the form claimed herein.

In a further advantageous construction according to the present invention, two mutually oppositely disposed rows of plug-in receptacles are provided in the base element. It is possible by axial offset of the plug-in receptacles of the two rows to limit the width of the base element because the plug-in receptacles, which are formed-in as recesses, can overlap in the projection along the base element without being fluidically connected with each other.

BRIEF DESCRIPTION OF THE DRAWINGS

These and other objects, features and advantages of the present invention will become more apparent from the following description when taken in connection with the accompanying drawing which shows, for purposes of illustration only, two embodiments in accordance with the present invention, and wherein.

DETAILED DESCRIPTION OF THE DRAWINGS

Figure 1:
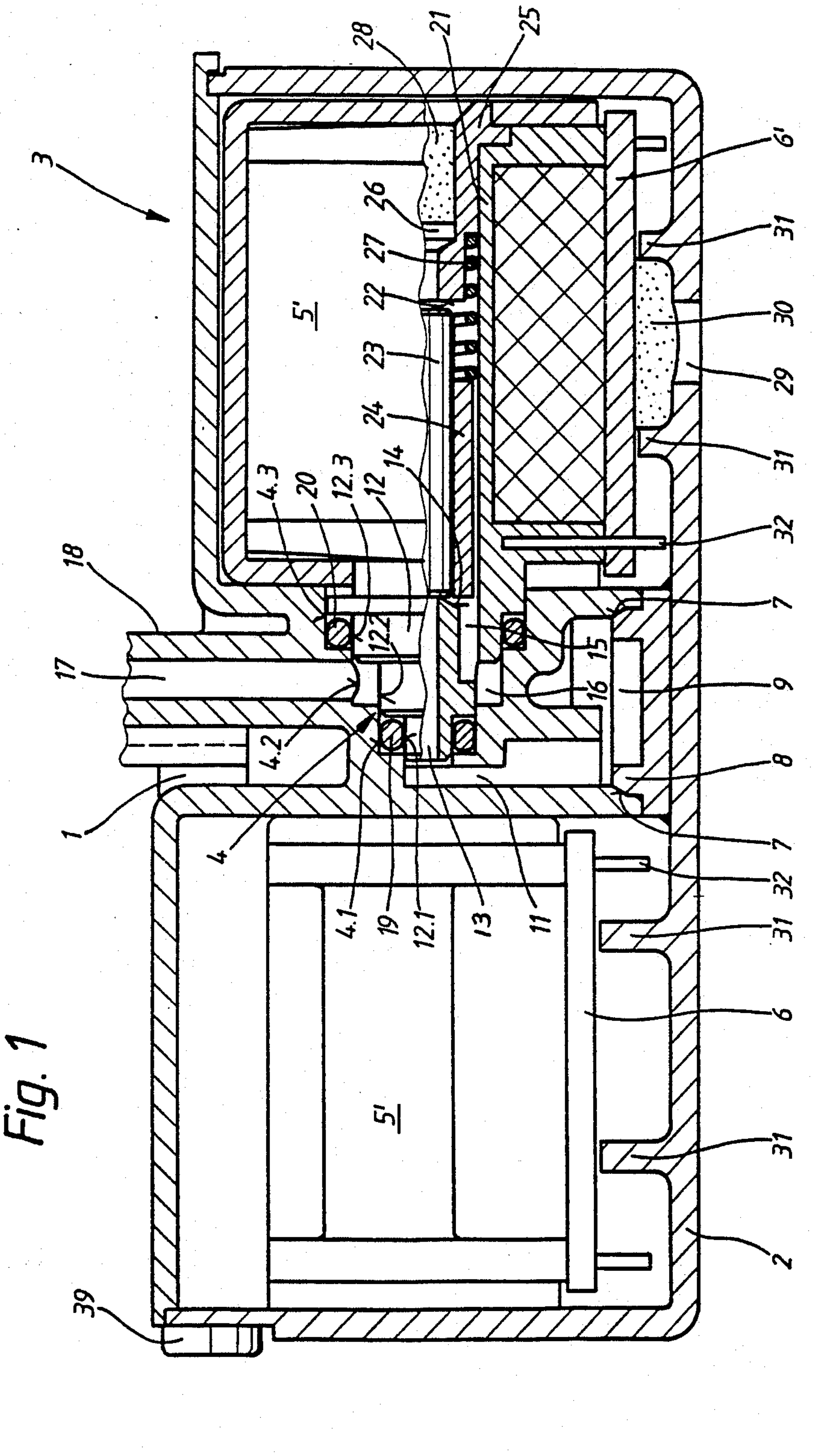
FIG. 1 is a cross-sectional view through a component assembly with two mutually oppositely arranged directional control valves in accordance with the present invention.

Referring now to the drawing wherein like reference numerals are used throughout the various views to designate like parts, a cover 2 is secured at a base element 1 constructed as plastic molded part for forming a housing generally designated by reference numeral 3 for solenoid directional control valves 5' and for two electrical printed circuit boards 6 and 6' electrically and mechanically rigidly connected with the directional control valves. A groove delimited by rectilinear contours 7 is formed-in into the base element 1, which is closed off by an elastic seal 8 fastened at the cover 2 for the formation of a pneumatic main channel 9. This main channel 9 is adapted to be connected by way of a feed connection piece 10 (FIG. 3) to a vacuum source or vacuum generator. Feed connection paths 11 branch off from the main channel 9 which terminate at their ends in the plug-in receptacles 4. The plug-in receptacles 4 are formed by three bores which become narrower in steps 4.3, 4.2 and 4.1, into which are plugged-in the directional control valves 5' which have fluidic plugs 12 arranged at the end thereof and constructed as cylindrical steps with step stages 12.3, 12.2 and 12.1.

A central bore 13 (FIG. 1) extends through ech plug 12; this central bore 13 is fludically connected to the respective feed connection 11 and enters into the interior space of the directional control valve 5' at a ring-shaped valve sealing seat 14. A lateral bore 15 in the plug 12 connects the interior space of the directional control valve 5' on the other side of the valve sealing seat 14 with an annular chamber 16 which is delimited about the step stage 12.2. of the plug 12 by the bore step 4.2 of the plug-in receptacle 4 and in which terminates a load connection path 17. The latter extends through a load connection piece 18 of the base element 1 to which, in turn, a fluid line can be connected.

For sealing the feed connection path 11 with respect to the load connection path 17, respectively, with respect to the annular chamber 16 in the plug-in receptacle 4, a first rubber sealing ring 19 is arranged on the step stage 12.1 of the plug 12 which abuts sealingly at the bore step 4.1. For sealing the annular chamber 16 against the atmospheric pressure prevailing in the housing 3, a second rubber sealing ring 20 is arranged on the step stage 12.3 of the plug 12 which sealingly abuts at the largest bore step 4.3.

The directional control valves 5' of the component assembly are all constructed essentially identical among one another. Their interior space is formed by a tubular guide member 21; the ring-shaped valve sealing seat 14 is arranged at the plug-side end of the tubular guide member 21 and a second valve sealing seat 22 is arranged at the end opposite the plug. Intermediate the two valve sealing seats 14 and 22, a double-acting valve member 23 having a tubular magnet armature member 24 is displaceably guided in the tubular guide member 21 between the two valve sealing seats 14 and 22. The valve sealing seat 22 is integrated in one piece into a plug 25. The latter includes a central bore 26 and is fixedly inserted into the tubular guide member 21. A return spring 27 is supported between the plug 25 and the tubular magnet armature member 24 and prestresses by way of the latter the valve member 23 against the valve sealing seat 14.

By selective closing or leaving open the center bore 26 of the plug 25, the directional control valves 5' used herein can be used in a most simple manner as 2/2-directional control valve—closed center bore 26—or as 3/2-directional control valve—open center bore 26.

In FIG. 1, the 3/2-directional control valve modification of the directional control valve 5' is illustrated whereby a sinter throttle 28 is inserted into the center bore 26.

An opening 29 is provided in the cover 2 which is covered off in an air-permeable manner by an elastic porous plastic part serving as filter 30. Furthermore, support elements 31 are formed-on at the cover 2 which support the PC boards 6 and 6' and thereby also positionally secure the directional control valves 5' which are mechanically an electrically fixedly connected with the respective printed circuit board 6 or 6' by way of electrical connecting pins 32.

Atmospheric pressure prevails as such in the housing 3 so that the 3/2-directional control valve 5' is operable in the illustrated position according to FIG. 1 to vent its load connection path 17 by way of the sinter throttle 28, the center bore 26, the valve sealing seat 22, a gap between the tubular magnet armature member 24 and the tubular guide member 21, the lateral bore 15 and the annular chamber 16. By energizing the 3/2-directional control valve, the valve member 23 is pressed magnetically against the force of the return spring 27 onto the valve sealing seat 22 and opens the valve sealing seat 14. As a result thereof, the main channel 9 is now connected with the load connection path 17 by way of the feed connection path 11, the center bore 13 in the plug 12, the valve sealing seat 14, the lateral bore 15, and the annular chamber 16. A vacuum-adjusting motor possibly connected to the load connection piece 18 can now be evacuated by means of the vacuum existing in the main channel 9.

The sinter throttle 28 deliberately prevents the inflow of air into the vacuum-adjusting motor evacuated against the spring force in order that the adjusting element thereof cannot snap back after de-energization of the 3/2-directional control valve into its normal or rest position impact-like under noise generation—which is undesirable, for example, in motor vehicle air-conditioning systems—but can carry out this movement only in a dampened manner.

Figure 2:
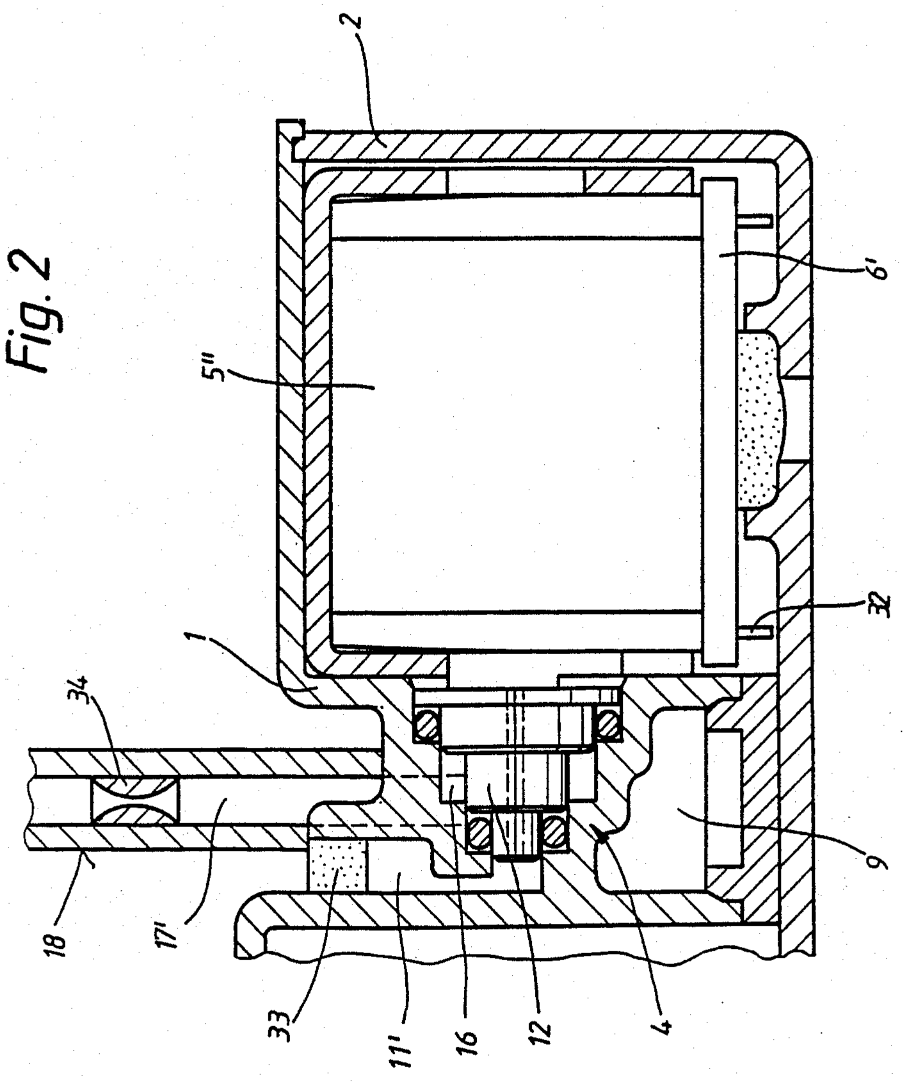
FIG. 2 is a partial cross-sectional view through a modified embodiment of a directional control valve assembly in accordance with the present invention.

A partial cross-sectional view of the component assembly with a 2/2-directional control valve 5″—that is, the center bore 26 of the plug 25 is closed off air-tight—is illustrated in FIG. 2. Differing from the arrangement in FIG. 1, a feed connection path 11′ connected with the atmospheric pressure is provided in this embodiment which terminates end-face in the plug-in receptacle 4 and into which is inserted a filter 33.

A further 2/2-directional control valve 5′ (not shown) is coordinated to the illustrated 2/2-directional control valve 5″ by connection with a common load connection path 17′ tangentially terminating in the plug-in receptacles 4, respectively, in the annular chambers 16 thereof of the two directional control valves. With the exception of an air-tight closure of the center bore 26 of its plug 25, the further directional control valve is constructed identically with the directional control valve illustrated in cross section in FIG. 1, i.e., its feed connection path 11 is a branch connection from the main channel 9. However, this further directional control valve is plugged-in into the base element 1 from the left side as viewed in FIG. 2, respectively, into a plug-in receptacle 4 accessible from the left, like the directional control valve not shown in cross section in FIG. 1. With the connection of the two 2/2-directional control valves described hereinabove with the common load connection path 17′, into which a flow throttle 34 is inserted, a single-acting vacuum adjusting motor connected with the corresponding load connection piece can be adjusted steplessly in a known manner. The flow throttle 34 thereby has the task to dampen regulating oscillations of the adjusting member by reducing the flow velocities in the load connection path 17′ with large pressure differences, for example, when feeding atmospheric pressure into the evacuated pressure chamber of the adjusting motor.

Figure 3:
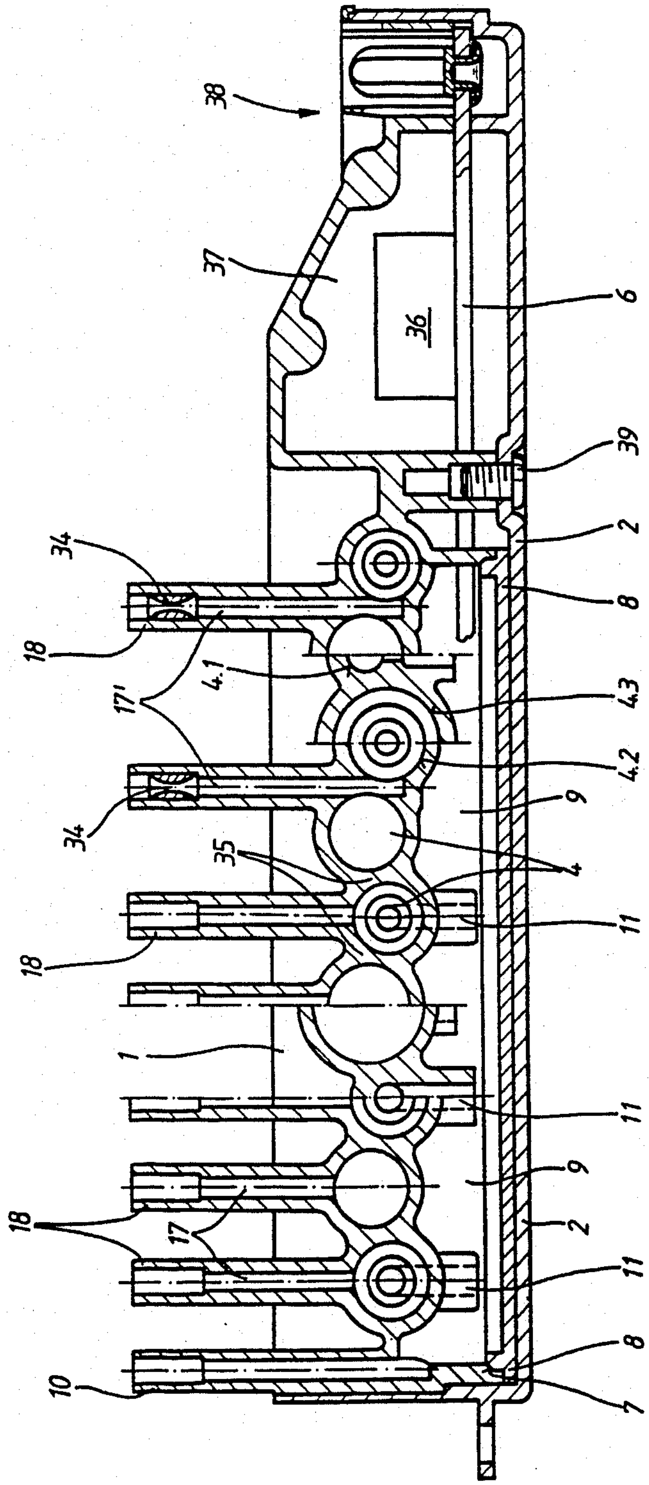
FIG. 3 is a longitudinal cross-sectional view through the base element in accordance with the present invention.

The arrangement of the plug-in receptacle 4 in two rows offset axially and in height as well as the arrangement of the feed connection paths 11 and of the load connection paths 17 and 17′ is illustrated in FIG. 3 which shows the base element 1 in longitudinal cross section without plugg-in directional control valves. Furthermore, the feed connection piece 10 of the pneumatic main channel 9 to the vacuum producer is illustrated in this figure.

3/2 directional control valves 5′ are plugged-in into the first five plug-in receptacles 4—as counted from the left—whereby the somewhat lower plug-in receptacles are accessible in the direction of viewing the drawing while the somewhat higher plug-in receptacles are complemented with directional control valves opposite the direction of viewing the drawing.

One feed connection path 11 each-branching off from the main channel 9—and one load connection path 7 therefore terminate in these five plug-in receptacles. This becomes visible in a lower cross-sectional plane between the third and fourth plug-in receptacle, again as counted from the left. This arrangement corresponds to the arrangement illustrated in cross section in FIG. 1. The next four plug-in receptacles are coordinated to one another pairwise which is realized by means of the load connection path 17′ tangentially terminating in two plug-in receptacles each. Also in this case the arrangement is made more clear by a lower cross-sectional plane between the second and third plug-in receptacle—as counted from the right. The first and third plug-in receptacle—again counted from the right—correspond to the cross-sectional illustration according to FIG. 2, therefore include feed connection paths 11′ connected with atmospheric pressure—not shown in FIG. 3—whereas the second and the fourth plug-in receptacle are connected with the main channel 9 by way of a feed connection path 11.

These four plug-in receptacles are provided for 2/2-directional control valves which admit vacuum and atmospheric pressure to the single-acting vacuum-adjusting motors by way of their common load connection paths 17′. The cross-sectional illustration of FIG. 3 also shows clearly the partial overlap of the plug-in receptacles of the two rows in the longitudinal projection of the base element 1, i.e., transversely to the direction of viewing, whereby the plug-in receptacles are fluidically closed off against one another by the partition walls 35. It becomes clear in particular by the arrangement of the common load connection paths 17′ that the bore steps 4.2 of the plug-in receptacles, respectively, the annular chambers 16 surrounded by the same, are located in one plane in the longitudinal projection of the base element. Of course, the possible number of plug-in receptacles 4 in a base element is not limited to the number illustrated in FIG. 3. Depending on need, still more or also fewer plug-in receptacles may be provided.

Finally, an electronic control unit 36 is illustrated as building block component in FIG. 3 which is arranged on the electric printed circuit board 6. An illustration space 37 of its own is provided for the control unit 36 in the base element 1; the control element 36 is electrically connected between a multi-plug connection generally designated by reference numeral 38 and the conductor paths of the printed circuit board 6 leading to the directional control valves. For example, feedback signals from vacuum-adjusting motors and/or temperature signals from sensors in the vehicle interior, etc. can be evaluated by means of the control unit 36 and can be converted into corresponding adjusting commands for the directional control valves.

In order to obtain a very small multi-plug connection also for a large number of valves, the control unit could also be designed exclusively as receiver component with a decoder of a time multiplex- or frequency multiplex-signal transmission for the control of the directional control valves, for example, with external control of the directional control valves.

Control signals for the directional control valves, for example, in the form of n-bit-words can then be transmitted by way of a two or three conductor multiplex line which is connected with the multi-plug connection, whereby a protection against error functions can be assured, on the one hand, by redundant transmission of the n-bit words with identity comparison of several successive words and, on the other, by an effective electrical interference suppression.

The fastening of the cover at the base element can take place by the illustrated plastic bolts 39 or by clips.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A component assembly of several directional control valve means electromagnetically shiftable independently of one another, comprising common base means provided with plug-in receptacle means, the directional control valve means being operable to be inserted into the plug-in receptacle means, fluidic feed and load connection means provided in the base means and terminating in the plug-in receptacle means, the directional control valve means being operable to separate from one another or connect with one another the fluidic feed and load connection means when plugged into the plug-in receptacle means, the plug-in receptacle means being fluidically sealed off by the directional control valve means when the latter are plugged in, the feed and load connection means terminating on a surface of the base means, at least one electrical printed circuit board means connected for the current distribution with the magnet windings of several directional control valve means, cover means secured at the base means and surrounding the directional control valve means and the printed circuit board means, said cover means forming together with the base means a housing means, the electrical printed circuit board means being further constructed as carrier means of the directional control valve means electrically and mechanically securely connected therewith and being fixed by the plug-in of the directional control valve means into the receptacle means, mutually corresponding contour means being provided at the cover means and at the base means for the formation and sealing of a pneumatic main channel extending through the housing means during the fastening of the cover means at the base means, a feed connection member arranged externally at the housing means and the feed connection means of a group of first directional control valve means which terminate in a surface of the base means delimiting the main channel, being connected by the main channel, support means provided at the cover means for positionally securing the directional control valve means and/or printed circuit board means, and feed connection means of a group of a second directional control valve means not connected with the main channel terminating open toward the atmospheric pressure at another surface of the base means.

2. A component assembly according to claim 1, wherein a first directional control valve means constructed as 2/2-valve is coordinated to each second directional control valve means, also constructed as 2/2-valve by connection to a load connection means common to the two 2/2-directional control valve means.

3. A component assembly according to claim 2, wherein the common load connection means of each coordinated pair of 2/2-directional control valves is introduced within the base means tangentially into the axially offset mutually oppositely disposed plug-in receptacle means of the two 2/2-directional control valves and is provided with a flow throttle means.

4. A component assembly according to claim 3, wherein the ledge-shaped base means includes two mutually oppositely arranged rows of plug-in receptacle means for directional control valve means, the plug-in receptacle means of one row being arranged axially offset with respect to the other row, a first row of directional control valve means being operatively connected with one printed circuit board means and being plugged into one row of plug-in receptacle means of the base means, and a second row of directional control valve means being mechanically and electrically fixedly connected with a further electrical printed circuit board means and being plugged into the other row of plug-in receptacle means whereby both printed circuit board means are electrically connected with each other.

5. A component assembly according to claim 2, wherein all directional control valve means in the de-energized condition are shifted into defined rest positions by return forces.

6. A component assembly according to claim 2, wherein an atmospheric-pressure feed-connection means arranged opposite the respective plug-in receptacle means and fed by openings in the housing means is provided at further first directional control valve means constructed as 3/2-valves, said 3/2-directional control valves being operable to connect their respective load connection means by alternate abutment of a double-acting valve member at one of two valve sealing seats either with the feed connection means connected to the main channel or with the atmospheric-pressure feed-connection means.

7. A component assembly according to claim 6, wherein all atmospheric-pressure feed-connection means and openings in the housing means are provided with filters which prevent the sucking-in of dirt particles from the atmospheric air.

8. A component assembly according to claim 7, wherein the filters in the atmospheric pressure-feed connection means of the 3/2-directional control valve means are constructed as sinter throttles.

9. A component assembly according to claim 6, wherein the plug-in receptacle means formed-in as recesses in the base means are constructed as cylindrical bores becoming narrower in diameter in several bore steps, the feed connection means terminating in the end area of the bore step with smallest diameter and the load connection means terminating in a bore step having a diameter lying between the smallest and largest step diameter, the directional control valve means including at their ends fluidic plug means constructed as cylindrical steps, a central bore leading to one valve sealing seat and a lateral bore terminating in a center step stage extending through the plug means, the center bore being fluidically connected in the plug-in receptacle means with the feed connection means and the lateral bore with the load connection means, the fluidic sealing of the plug-in receptacle means as well as the feed and load connection means with respect to one another taking place by elastic sealing rings arranged on both sides of the center step stage of the plug means on adjacent step stages, and the elastic sealing rings sealingly abutting, on the one hand, at the respective step stage and, on the other, at a bore stage of the plug-in receptacle means.

10. A component assembly according to claim 1, wherein an atmospheric-pressure feed-connection means arranged opposite the respective plug-in receptacle means and fed by openings in the housing means is provided at further first directional control valve means constructed as 3/2-valves, said 3/2-directional control valves being operable to connect their respective load connection means by alternate abutment of a double-acting valve member at one of two valve sealing seats either with the feed connection means connected to the main channel or with the atmospheric-pressure feed-connection means.

11. A component assembly according to claim 10, wherein all atmospheric-pressure feed-connection means and openings in the housing means are provided with filters which prevent the sucking-in of dirt particles from the atmospheric air.

12. A component assembly according to claim 11, wherein the filters in the atmospheric pressure-feed connection means of the 3/2-directional control valve means are constructed as sinter throttles.

13. A component assembly according to claim 10, wherein all directional control valve means in the deenergized condition are shifted into defined rest positions by return forces.

14. A component assembly according to claim 1, wherein the ledge-shaped base means includes two mutually oppositely arranged rows of plug-in receptacle means for directional control valve means, the plug-in receptacle means of one row being arranged axially offset with respect to the other row, a first row of directional control valve means being operatively connected with one printed circuit board means and being plugged into one row of plug-in receptacle means of the base means, and a second row of directional control valve means being mechanically and electrically fixedly connected with a further electrical printed circuit board means and being plugged into the other row of plug-in receptacle means whereby both printed circuit board means are electrically connected with each other.

15. A component assembly according to claim 14, wherein the plug-in receptacle means of the two rows which are formed-in as recesses in the base means, partially overlap in the longitudinal projection of the base means while leaving partition walls.

16. A component assembly according to claim 15, wherein the two rows of plug-in receptacle means are arranged in the base means offset in height with respect to one another.

17. A component assembly according to claim 14, wherein the two rows of plug-in receptacle means are arranged in the base means offset in height with respect to one another.

18. A component assembly according to claim 1, wherein the plug-in receptacle means formed-in as recesses in the base means are constructed as cylindrical bores becoming narrower in diameter in several bore steps, the feed connection means terminating in the end area of the bore step with smallest diameter and the load connection means terminating in a bore step having a diameter lying between the smallest and largest step diameter, the directional control valve means including at their ends fluidic plug means constructed as cylindrical steps, a central bore leading to one valve sealing seat and a lateral bore terminating in a center step stage extending through the plug means, the center bore being fluidically connected in the plug-in receptacle means with the feed connection means and the lateral bore with the load connection means, the fluidic sealing of the plug-in receptacle means as well as the feed and load connection means with respect to one another taking place by elastic sealing rings arranged on both sides of the center step stage of the plug means on adjacent step stages, and the elastic sealing rings sealingly abutting, on the one hand, at the respective step stage and, on the other, at a bore stage of the plug-in receptacle means.

19. A component assembly according to claim 1, further comprising an electrical control means which is electrically connected with an electrical multi-plug connection arranged at the housing means, the electrical control means being securely connected with a respective electrical printed circuit board means and being electrically connected between the multi-plug connection and the last-mentioned printed circuit board means.

* * * * *